United States Patent [19]

Soroka et al.

[11] Patent Number: 4,579,016
[45] Date of Patent: Apr. 1, 1986

[54] SELF-CONTAINED TWO-AXIS WRIST MODULE

[75] Inventors: Daniel P. Soroka, Imperial; Mark S. Stoutamire, Carnegie, both of Pa.

[73] Assignee: Westinghouse Electric Corp., Pittsburgh, Pa.

[21] Appl. No.: 471,119

[22] Filed: Mar. 1, 1983

[51] Int. Cl.[4] ............................................. F16H 37/02
[52] U.S. Cl. ...................................... 74/461; 74/417; 901/29
[58] Field of Search ............. 74/417, 479, 661, 665 A, 74/665 B, 665 C; 414/4, 735; 901/26, 27, 29

[56] References Cited

U.S. PATENT DOCUMENTS

| 2,906,143 | 9/1959 | Musser | 74/640 |
| 2,959,301 | 11/1960 | Willsea | 901/26 X |
| 3,826,383 | 7/1974 | Richter | 214/1 BD |
| 3,922,930 | 12/1975 | Fletcher et al. | 901/29 X |
| 4,030,617 | 6/1977 | Richter | 901/29 X |
| 4,047,448 | 9/1977 | Pardo et al. | 74/417 |
| 4,068,536 | 1/1978 | Stackhouse | 74/417 |
| 4,246,661 | 1/1981 | Pinson | 901/29 X |
| 4,365,928 | 12/1982 | Baily | 414/735 |
| 4,402,234 | 9/1983 | Malarz et al. | 74/417 |
| 4,431,366 | 2/1984 | Inaba et al. | 414/735 |

FOREIGN PATENT DOCUMENTS 56-152553  11/1981  Japan ...................................... 901/29

OTHER PUBLICATIONS

*Industrial Robots,* vol. 1, William R. Turner, pp. 3 and 7, printed Apr. 1979.

Primary Examiner—William F. Pate, III
Assistant Examiner—Dwight G. Diehl
Attorney, Agent, or Firm—E. C. Arenz

[57] ABSTRACT

A two-axis wrist module includes a roll part 14 rotatable about a first axis A—A driven by shaft 38 coupled through harmonic drive unit 42 functioning as a speed reducer and shaft 44, and a bend part 16 carried by the roll part for rotation about the axis B—B and driven by shaft 68 and shaft 72 coupled to the bend part by the second harmonic drive unit functioning as a speed reducer, the entire wrist module being self-contained in that the motor means for obtaining the two-axis movement is provided in the power enclosure 10 of the wrist module and independent of any powering transmitted mechanically to the wrist module.

7 Claims, 2 Drawing Figures

SELF-CONTAINED TWO-AXIS WRIST MODULE

This invention pertains to the art of multi-axis wrist modules such as are usable with industrial robots and the like for performing such operations as welding and material handling, for example.

BACKGROUND OF THE INVENTION

Multi-axis wrists are known in the art as exemplified by U.S. Pat. Nos. 3,826,383 and 4,068,536, both of which disclose wrists providing motion about three different axes.

It is the aim of this invention to provide a two-axis wrist module which is of relatively small size and low weight, of relatively simple structure, of a character which also lends itself to being substantially fluid tight and which is basically self-contained in the sense that the drive means for obtaining the two-axis movement is available from the module itself. It is a further aim of the invention to provide a wrist module in which harmonic drive units are contained in the wrist module itself in a fashion to obtain relatively high gear reduction so that the drive means can take the form of high speed, low torque motors.

SUMMARY OF THE INVENTION

In accordance with the invention, the two-axis wrist module comprises four main housing parts, namely, a power enclosure containing first and second drive motor means, an open-ended hollow drive housing mounted to the power enclosure, a roll part of the wrist which is rotatably carried from the open end of the drive housing and is rotatable about a first axis, and a bend part of the wrist unit having a housing rotatably mounted to the roll part of the wirst for rotation about a second axis oblique to the first axis. The drive housing contains a harmonic drive unit mounted so as to function as a speed reducer and, in the currently preferred form, with the cup of the harmonic drive unit being coupled to the roll part of the wrist to provide rotation thereto as a result of the operation of the first motor means. The bend part of the wrist contains the second harmonic drive unit mounted to function as a speed reducer but, in the currently preferred form, with the cup of the harmonic drive unit being fixed to the roll part of the wrist and with the second motor means in the power enclosure driving a shaft on the first axis and coupled to a shaft on the second axis which in turn drives the wave generator of the harmonic drive means to effect the rotation of the bend part through the fixed connection of the outer circular spline to the bend part.

DESCRIPTION OF THE PREFERRED EMBODIMENT

Figure 1:
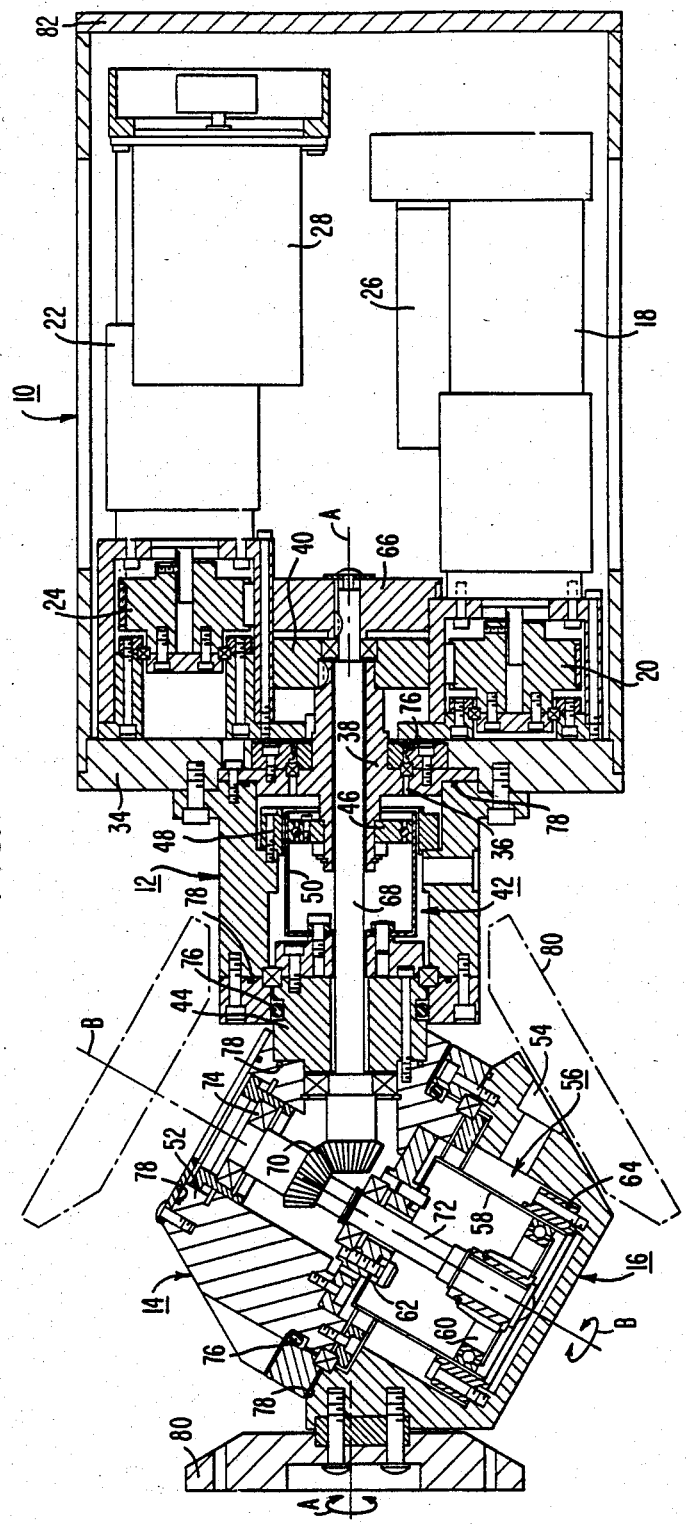
FIG. 1 is a side view, mainly in section of the wrist module according to the invention.
Figure 2:
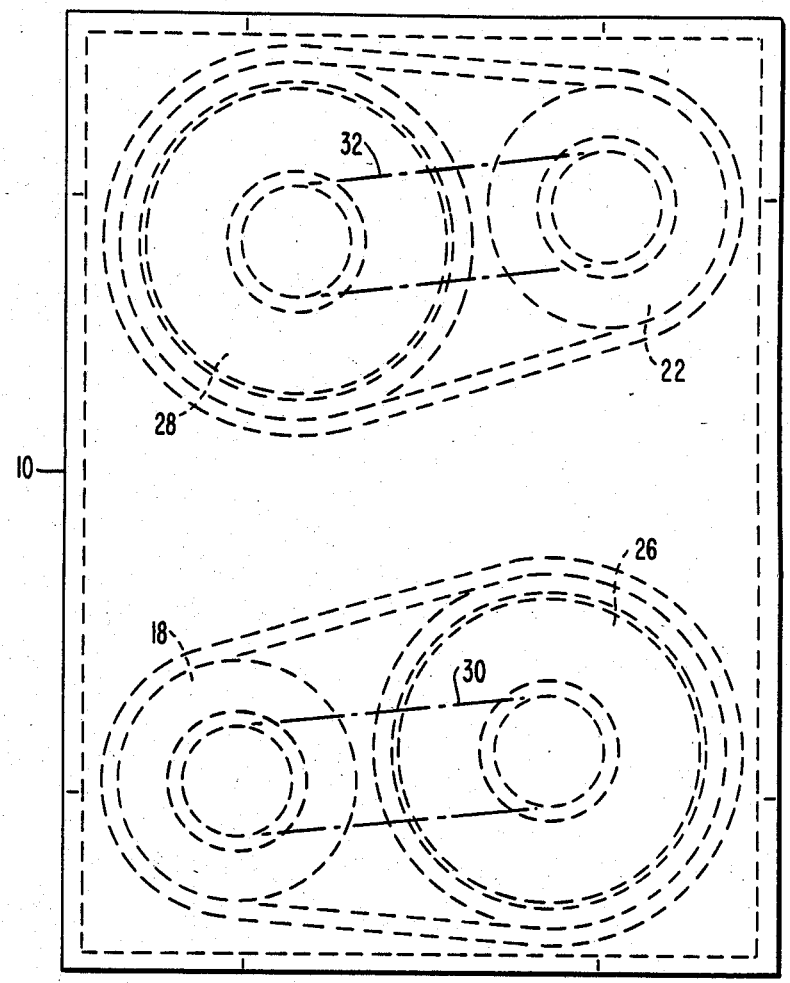
FIG. 2 is an end elevation view of the power enclosure.

The main parts of the wrist module include the power enclosure 10, the drive housing 12, the roll part 14 of the wrist, and the bend part 16 of the wrist.

The power enclosure 10 contains first and second motor means in the form of electric motor 18 driving pulley 20, and electric motor 22 driving pulley 24. At the ends of the motors opposite the drive pulleys, the motors are coupled to position feedback means such as resolvers 26 and 28 through the pulley and belt arrangements 30 and 32, respectively.

The open-ended hollow drive housing 12 is fixed to the distal end wall 34 of the power enclosure 10 which includes an opening or bore 36 in it in which is housed a first hollow rotatable shaft 38 with pulley 40 affixed on its one end which is driven from the pulley 20 of the first motor by means of a timing belt. The drive housing 12 contains a first harmonic drive unit generally designated 42 which couples the output end of the shaft 38 in speed reducing relation to the roll part 14 which includes a hollow shaft portion 44 rotatably mounted in the open end of the drive housing 12. Harmonic drive units are well known and commercially available from the Harmonic Drive Division of USM. U.S. Pat. No. 2,906,143 provides a disclosure of the general type of harmonic drive unit such as may be used in this invention, such units including three main elements identified as the wave generator, the flexspline and the circular spline, the functions of each of these parts being well known to those versed in this art.

As employed in the invention, the first harmonic drive 42 has its wave generator 46 fixed to the shaft 38 for rotation therewith, the circular spline 48 is fixed to the drive housing 12 and is stationary, and the flexspline 50, which has the form of a non-rigid cylindrical thin wall cup, has its free end fixed to the shaft portion 44 of the roll part 14. With this arrangement, the harmonic drive unit functions as a speed reducer and in the currently proposed application of the wrist module provides a speed reduction in the order of 100:1 and a torque increase. Thus the transmission of power from the first motor 18 to effect rotation of the roll part 14 about a first axis A—A is through pulley 20 to pulley 40, hollow shaft 38, harmonic drive unit 42, and shaft 44 which is in fixed relation to the housing part 52 of the roll part 14 of the wrist module.

The bend part 16 of the wrist module includes a housing 54 which is rotatably carried from the roll part 14 and contains a second harmonic drive unit generally designated 56. This unit is arranged with the flexspline 58 having its one end opposite the wave generator 60 fixed to the roll part as at 62, and its circular spline 64 fixed to the bend part. Rotation of the bend part relative to the roll part is derived from the second motor 22 and its pulley 24 which is coupled by a timing belt to the pulley 66 fixed on that end of the shaft 68 located in the power enclosure. The shaft 68 extends along the axis A—A and through the first shaft 38 and second shaft 44 into the roll part where it is coupled through bevel gearing 70 to a fourth shaft 72 which has the wave generator 60 fixed to it. The fourth shaft 72 extends along an axis B—B which is oblique to the first axis A—A. The end of the fourth shaft 72 opposite the wave generator end is journaled in bearings 74 carried by the roll part housing 52.

With the arrangement of the second harmonic unit 56 as shown, and with the flexspline 58 being held stationary relative to the roll part, the wave generator 60 functions as the input with the rotation of the fourth shaft 72, and the circular spline 64 functions as the output; and since it is fixed to the bend part, the bend part will rotate with the circular spline. In the arrangement of the first harmonic drive unit 42, the input and output have rotation in opposite directions, while in the arrangement of the second harmonic drive unit 56, the rotation is in the same direction. The relative rotation of the inputs and outputs can be selected in accordance with whether the circular spline or the flexspline cup is held stationary. The second harmonic drive unit is also selected to provide a speed reduction in the order of 100:1 and a torque increase.

It is considered desirable that the interior space of the wrist module up to the end wall 34 of the power enclosure be substantially filled with a liquid lubricant so that the moving parts are essentially bathed in lubricant. To this end means are provided to seal at the interface between parts that are either stationary with respect to each other, or are relatively rotatable, where there would be a chance for leakage in both cases. Accordingly, O-rings are provided at strategic locations. The O-rings identified by the numberal 76 are those that are provided between relatively rotatable parts, and those identified by the numberal 78 are located between stationary parts.

A mounting flange 80 is secured to the bend part 16 and the particular tool being used with the wrist module is mounted on the flange. The bend part is capable of being rotated through 360° and the roll part is also capable of being rotated through 360° so that the mounting flange movement has the range indicated by the phantom views of the flange.

Since the two harmonic drive units provide significant speed reduction and are housed within the wrist and coupled directly to the output motion, it is possible to use high speed, low torque motors such as permanent magnet DC servo motors so that the wrist module can be of relatively small size and low weight. Since the wrist module conatins its own powering means for effecting the two-axis movement of the wrist, and is in that sense self-contained, the module can be mounted at the end of a robot forearm or the like without any requirement of powering the two-axis movement through the forearm. The module can be mounted to the forearm or whatever device is to control movement of the module through its back plate 82 at the righthand side of the module in FIG. 1. Also, this facilitates the removal and/or replacement of the wrist module as a whole without any requirement of decoupling from power means transmitted through a forearm or the like.

We claim:

1. A self-contained two-axis wrist module comprising:
   a power enclosure containing first and second motor means and having a distal end wall with a bore therein;
   an open-ended hollow drive housing projecting from said distal end wall and containing a first harmonic drive unit;
   a first hollow rotatable shaft in said bore of said end wall and having its one end in said enclosure coupled to be rotatably driven by said first motor means and its other end located in said drive housing and coupled to the wave generator portion of said first harmonic drive unit;
   a roll part of said wrist comprising a housing carried by a second hollow shaft rotatably mounted in said open end of said drive housing and coupled to be driven by said first harmonic drive unit, said roll part rotating on a first axis coaxial with the axis of said first and second hollow shafts;
   a bend part of said unit including a housing rotatably carried by said roll part and rotatable about a second axis oblique to said first axis;
   means to rotate said bend part including a third shaft having a driven end in said power enclosure and extending along said first axis through said first and second shafts into said roll housing, a fourth shaft extending along said second axis and coupled to be driven by said third shaft in said roll housing, and a second harmonic drive unit in said bend housing having its wave generator driven by said fourth shaft, said second harmonic drive unit being connected to drive said bend part housing;
   said module being self-contained and adapted to be mounted at the end of the forearm of a robot or the like and operable to provide two-axis movement directly from said first and second motor means and independent of powering transmitted by means in said forearm.

2. A module according to claim 1 including first and second position feedback means coupled to said first and second motor means, respectively, in said power enclosure.

3. A wrist module according to claim 1 including:
   means sealing said drive housing, said roll part, and said bend part against leakage; and
   a liquid lubricant occupying substantially all the interior space of said housing and said parts.

4. A wrist module according to claim 1 wherein:
   said first harmonic drive unit includes a rigid circular spline fixed in non-rotatative relation to said drive housing.

5. A wrist module according to claim 4 wherein:
   said second harmonic drive has its flexspline fixed to said roll part housing.

6. A wrist module according to claim 1 wherein:
   said first and second harmonic drive units function as speed reducers providing speed reductions in the order of one hundred to one.

7. A wrist module according to claim 6 wherein:
   said first and second motor means comprise high-speed, low-torque electric motors.

* * * * *